July 21, 1970 J. W. WIPSON ET AL 3,521,072
VARIABLE MASKING OF RADIATION SENSITIVE AREAS ALONG X AND
Y AXES BY PIVOTALLY MOUNTED CONTROL SHAFT
Filed Aug. 21, 1967

INVENTORS
JAMES W. WIPSON
JAIRUS D. HALL
RICHARD M. BICKFORD
STUART B. WAHLBERG
ATTORNEY

United States Patent Office

3,521,072
Patented July 21, 1970

3,521,072
VARIABLE MASKING OF RADIATION SENSITIVE
AREAS ALONG X AND Y AXES BY PIVOTALLY
MOUNTED CONTROL SHAFT
James W. Wipson, Corona Del Mar, Calif. (659 Vista
Bonita, Newport Beach, Calif. 92660); Jairus D. Hall,
156 Riva Alto Canal, Long Beach, Calif. 90803;
Richard M. Bickford, 1501 Johnson Place, Fullerton,
Calif. 92633; and Stuart B. Wahlberg, Wilbraham,
Mass. (Box 2862, Long Beach, Calif. 90801)
Filed Aug. 21, 1967, Ser. No. 661,909
Int. Cl. G01d 5/34
U.S. Cl. 250—231                    9 Claims

ABSTRACT OF THE DISCLOSURE

A control apparatus for converting a mechanical movement to an electrical signal. The apparatus includes a pivotally mounted control shaft. A shadow mask member coupled to the control shaft, a light source and a dual photoconductor are appropriately arranged so that movement of the shaft from a normal position causes light to impinge on one of the photoconductive areas of the photoconductor thereby producing an output signal which may be employed for operating a servomotor or other electrical loads.

This invention relates to a control apparatus and, more particularly, to a control apparatus in which a mechanical movement is converted into an electrical signal which is delivered to a servomotor or other electrical device.

The present invention is described herein specifically in connection with a control apparatus for operating what is known in the motion picture and television industry as a pan and tilt mechanism, that is, a mechanism which tilts and rotates instruments such as cameras or lights. Such a mechanism employs a control stick which is manually operable for remotely controlling servomotors which appropriately position the camera or light. Reference is made to U.S. Pat. No. 3,164,838 for a detailed description of one type of such a pan and tilt mechanism. It is understood, however, that the invention may be employed in connection with any form of apparatus wherein it is desired to control motors, electromechanical actuators, electronic positioning devices, etc., by electronic means.

The prior art discloses many forms of control apparatuses which are suitable for converting mechanical movements into electrical signals such as is required for a pan and tilt mechanism. An example of such a control apparatus is one described in U.S. Pat. No. 2,762,234 which employs gears and potentiometers for converting the movement of a control shaft into an electrical signal. U.S. Pat. No. 3,304,434 discloses a control apparatus employing rotary transducers for converting the movement of a rotatable ball into electrical signals. Other known control apparatuses employ linear variable resistors or strain sensitive elements for converting mechanical movements into electrical signals. Such apparatuses are relatively complex from both the electrical and mechanical standpoint, oftentimes are heavy and bulky, are expensive or fail to provide the requisite sensitivity and speed of control.

It is, therefore, the principal object of the present invention to provide a simple and inexpensive control apparatus for converting a mechanical movement into an electrical signal.

According to the principal aspect of the present invention, a movable control member such as a pivotally mounted control shaft of a pan and tilt mechanism is provided with a shadow mask element which moves in response to the movement of the shaft. A light source is positioned at one side of the element out of its path of movement while a dual photoconductor is positioned at the other side of the element also outside of its path of movement. When the control shaft is in a normal position, the shadow mask is disposed between the light source and dual photoconductor causing a shadow to be cast upon both photoconductive areas of the dual photoconductor. A positive voltage is coupled to one of the photoconductive areas of the photoconductor and a negative voltage to the other photoconductive area so that when the control shaft and, therefore, the shadow mask element is deflected from its normal position, illumination from the light source impinges upon one of the photoconductive areas of the photoconductor so that either a positive or negative output voltage will be generated by the apparatus. The output signal may be connected to a suitable servomotor or other electrically driven mechanism to effect movement of the pan and tilt mechanism. Since either a positive or negative function is produced by the apparatus of the invention, either forward or reverse drive of the servomotor is achieved. The apparatus is therefore seen to be simple in construction, inexpensive and avoids the use of gears, potentiometers, rotary transformers, linear variable resistors, strain sensitive elements, etc., employed in presently available control apparatuses.

Other objects, aspects and advantages will become apparent from the following description taken in conjunction with the accompanying drawing wherein.

Figure 1:
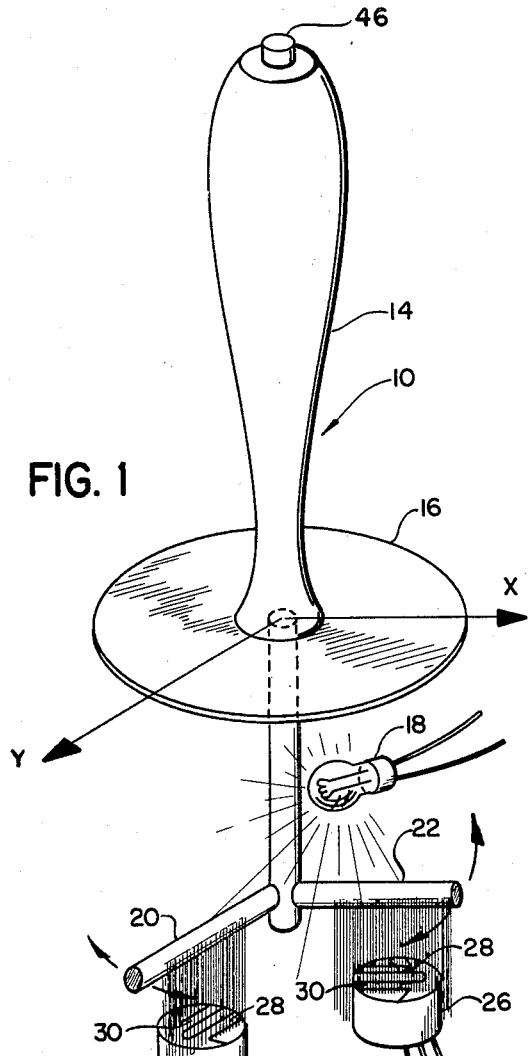
FIG. 1 is a schematic view of the preferred embodiment of the invention.

Referring now to the drawings in detail, there is shown in FIG. 1 a preferred embodiment of the present invention, generally referred to by numeral 10. The apparatus 10 includes a control shaft 12 having a handle 14 at its upper end. The shaft 12 is mounted for pivotal movement about an axis extending laterally through the longitudinal axis thereof by means of a flexible rubber or metallic diaphragm 16 which is secured into the housing wall (not shown) of the apparatus. The diaphragm 16 serves to retain the control shaft 12 in a central vertical position as illustrated in FIG. 1. When the shaft is manually deflected from such normal position by exerting a lateral force upon the handle 14, the diaphragm 16 flexes. When the force upon the handle is removed, the diaphragm serves to return the shaft 12 to its central position as well known in the art. It is understood that such mounting mechanism for the control shaft 12 constitutes no part of the present invention. For example, the control shaft could be mounted in a ball and socket arrangement, but such would have the disadvantage that it would not automatically return the control shaft to a central vertical position as does the flexible diaphragm 16 as is desired for controlling a pan and tilt mechanism.

It can be appreciated that the control shaft 12 mounted in the manner described hereinabove is capable of movement about the X and Y axes indicated in FIG. 1.

For two-axis control, there is provided below the diaphragm 16 a light source 18, two laterally extending shadow mask elements 20 and 22 parallel to and spaced from the X and Y axes and dual photoconductors 24 and 26 positioned underneath the shadow mask elements 20 and 22, respectively. The shadow mask elements 20 and 22 are in the form of cylindrical tubes and are so positioned underneath the light source 18 as to cast a line shadow upon the surfaces of the dual photoconductors 24 and 26. As can be appreciated, pivotal movement of the control shaft will cause the elements 20 and 22 to move in a slightly arcuate path as indicated by the arrows in FIG. 1.

Figure 2:
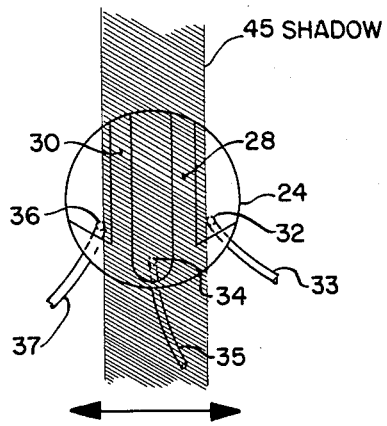
FIG. 2 is an enlarged plan view of the dual photoconductor employed in FIG. 1 showing the position of the shadow when the control shaft of the apparatus in FIG. 1 is in its normal neutral position.

As best seen in FIG. 2, the dual photoconductor 24, which is identical to the photoconductor 26, has two photoconductive areas 28 and 30 and three terminals 32, 34 and 36 each carrying its own lead wire 33, 35 and 37. The terminal 34 is common to both of the photoconductive areas 28 and 30 so that in an electrical circuit the dual photoconductor appears as a pair of resistors having a common output terminal, which resistors are variable depending upon the incident illumination impinging upon the photoconductive areas. A suitable dual photoconductor for use in the present invention is one sold under the trade name "Type CL703/2" manufactured by Clairex Corporation of New York. As can be seen from FIGS. 1 and 2, the photoconductive areas of photoconductor 24 are spaced apart along a line extending generally in the same direction as the path of movement of the associated shadow mask element 20. Photoconductor 26 is positioned relative to the shadow mask element 22 in the same manner.

Figure 3:
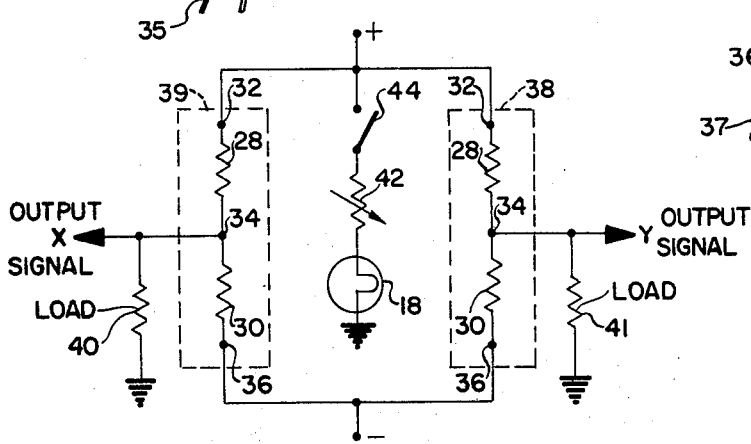
FIG. 3 illustrates the circuit used in the apparatus of the invention.

Reference is now made to FIG. 3 in which there is illustrated the preferred electrical circuit for the apparatus of the invention. The elements encompassed by the blocks 38 ad 39 in the circuit represent the two dual photoconductors 24 and 26, respectively, in FIG. 1 with the resistors being equivalent to the photoconductive areas of the dual photoconductors and indicated by the same numerals. As seen in FIG. 3, a positive voltage is applied to the terminal 32 of each photoconductor and a negative voltage applied to the terminal 36 of the photoconductors while the common terminals 34 provide the X and the Y output signals of the circuit which may be connected through suitable servo amplifiers (not shown) to loads 40 and 41, respectively, such as servomotors. The light source 18 is connected through a variable resistor 42 and normally open switch 44 to the positive voltage source. The switch 44 is actuated by a button 46 at the upper end of the handle 14 as shown in FIG. 1. The variable resistor 42 controls the intensity of the light source 18 and, therefore, provide a control of the sensitivity of the apparatus.

In operation of the apparatus illustrated in FIGS. 1, 2 and 3, when the control shaft 12 is in its normal vertical position as shown, the shadow mask elements 20 and 22 cause a shadow 45 to fall upon both of the photoconductive areas 28 and 30 of both dual photoconductors 24 and 26 as best seen in FIG. 2. Thus, with no illumination impinging upon the photoconductive areas, the electrical circuit of the apparatus is electrically balanced and no voltage appears at either of the output terminals 34 of the photoconductors. However, when the control shaft 12 is manually moved, for example, in a manner so as to pivot about only the Y axis, the shadow mask element 20 will move in a slightly arcuate path as indicated by the arrows at the end of element 20 in FIG. 1, thus resulting in the shadow 45 moving in a lateral direction as indicated by the arrow in FIG. 2 so that one of the photoconductive areas 28 or 30 is exposed to illumination from the light source 18. Depending upon the direction of movement of the shaft, and upon which photoconductive area is exposed, an electrical unbalance will result in the electrical circuit of the apparatus with the result that a positive or negative voltage output will be generated by the photoconductor. It is understood that when the control shaft 12 is pivoted about the X axis, the photoconductor 26 will also deliver either a positive or a negative output signal depending upon the direction of movement of the shaft. Consequently, there is provided by the present invention a two-axis control providing both a positive and negative function. Hence, servomotors connected through servo amplifiers to the output terminals 34 of the photoconductors may be driven either in a forward or reverse direction.

It is understood that only one photoconductive area of a photoconductor should be exposed to illumination at one time, otherwise the output voltage at the common terminal 34 of the device will approach zero as both areas become exposed. This may be achieved by limiting the movement of the shadow mask elements 20 and 22 by providing a sufficiently heavy flexible diaphragm 16 to prevent excessive movement of the shaft 12 or by providing suitable stop elements on both sides of each shadow mask element, such as the side walls of the housing (not shown) for the control apparatus.

Figure 4:
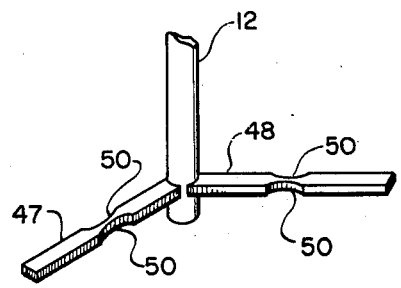
FIG. 4 illustrates a modified form of the shadow mask elements which may be employed in the apparatus illustrated in FIG. 1.
Figure 5:
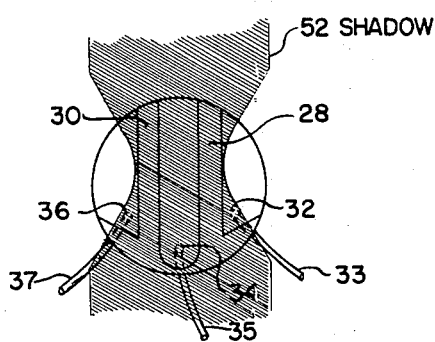
FIG. 5 is an enlarged plan view of a dual photoconductor showing the shape of the shadow cast thereon when the shadow mask element illustrated in FIG. 4 is employed in the apparatus of the invention.

With the cylindrical shadow mask elements 20 and 22 which provide a rectangularly shaped shadow across the photoconductors as seen in FIG. 2, a linear change in resistance of the exposed photoconductive areas 28 and 30 will result. Thus, the output signal of the photoconductors is a linear function of the mechanical force applied against the control shaft 12. Another feature of the invention is to provide means whereby the output signal of the control apparatus is a nonlinear function of the mechanical force applied against the control shaft 12. This is achieved, as best seen in FIG. 4, by employing shadow mask elements 47 and 48 having variable cross sections as provided by the arcuate cut-out portions 50. Such shadow mask elements will cast a shadow 52 having arcuate sides as shown in FIG. 5 so that movement of the shadow resulting from movement of the control shaft 12 results in an increasing area of the photoconductive portions of the photoconductors being exposed to illumination when the shadow is moved in either of the directions indicated by the arrow in FIG. 5. Thus, by the use of such a non-uniformly shaped shadow mask element as illustrated in FIG. 4, a nonlinear output signal is produced by the apparatus. It is understood of course that the shadow mask elements 47 and 48 may take any configuration as desired depending upon the output signal to mechanical force function desired by the operator.

Although the present invention has been described in connection with a control for a pan and tilt mechanism wherein the control shaft 12 is operated manually, it is understood that the shaft could be operated by mechanical means if desired. Also, if only one axis control is required, one of the shadow mask elements and dual photoconductors could be eliminated. Of course, if the element whose movement is being converted into an electrical signal moves along three axes, a third dual photoconductor would be required.

Although several embodiments of the invention have been disclosed herein for purposes of illustration, it will be understood that various changes may be made in the form, details, arrangement and proportions of the various parts in such embodiments without departing from the spirit and scope of the invention as defined by the appended claims.

What is claimed is:

1. A control apparatus comprising:
   a control shaft pivotally mounted about a pivot point for movement about X and Y axes passing through said point;
   a pair of shadow producing members extending laterally, from said control shaft at a point spaced from said pivot point, one of said members being substantially parallel to said X axis, and the other of said members being substantially parallel to said Y axis;
   a pair of dual photoconductors each associated with one of said shadow producing members, each dual photoconductor being positioned outside of the path of movement of its associated shadow producing member and at one side of said path, each dual photoconductor having two photoconductive areas and first, second and third terminals, said second terminals being common to both of said areas and being adapted to be connected to a load for delivering an output signal thereto, the photoconductive areas of each of said dual photoconductors being spaced apart along a line extending generally in the same direction as the path of movement of its associated shadow producing member;

a light source positioned outside of the path of movement of each of said members and at the other side of each of said paths;

each of said dual photoconductors being positioned so as to receive illumination from said light source;

in one position of said control shaft, said shadow producing members being positioned between said dual photoconductors and light source so as to prevent illumination from said light source from impinging upon either of the photoconductive areas of said dual photoconductors, and when said control shaft is deflected from said one position illumination from said light source impinges upon the exposed photoconductive area of at least one of said dual photoconductor; and means for applying a positive voltage to said first terminal and a negative voltage to said third terminal of said dual photoconductors.

2. An apparatus as set forth in claim 1 wherein said shadow producing members have a uniform cross-section.

3. An apparatus as set forth in claim 1 wherein said shadow producing members have a variable cross section.

4. An apparatus as set forth in claim 1 including means connected to said light source for varying the intensity thereof.

5. An apparatus as set forth in claim 1 wherein said control shaft is manually movable.

6. An apparatus as set forth in claim 1 including manually operable switch means at one end of said control shaft for controlling the intensity of said light source.

7. An apparatus as set forth in claim 1 wherein means is provided for normally maintaining said control shaft in said one position. and said shaft being deflectable from said position only upon exerting a mechanical force thereto.

8. A control apparatus as set forth in claim 1 including means permitting only one of said photoconductive areas of each of said dual photoconductors to be exposed to illumination from said light source at any single instance.

9. A control apparatus comprising:
a control element having a normal stationary position and including a shaft pivotally mounted for movement about X and Y axes extending laterally through the longitudinal axis of said shaft;

a radiation mask extending laterally from said shaft and spaced from and generally parallel to said laterally extending X axis;

a second radiation mask extending laterally from said shaft and spaced from and generally parallel to said laterally extending Y axis;

radiation sensitive means positioned outside of the path of movement of said first mask and at one side of said path;

a second radiation sensitive means positioned outside of the path of movement of said second mask and at one side of said path;

each of said radiation sensitive means having two radiation sensitive areas and a common terminal adapted to be connected to a load for delivering an output signal thereto;

a source of radiation disposed outside of and at the other side of said paths;

each of said masks being shaped and positioned to prevent radiation from said source from impinging upon either of its respective radiation sensitive areas when said control element is in its normal stationary position;

only one of said radiation sensitive areas of each pair being exposed to said radiation when said control element has a movement component in one direction along at least one of said axes and only the other of said radiation sensitive areas of each pair being exposed to said radiation when said movement component is in the opposite direction;

circuit means including said first radiation sensitive means, said radiation sensitive means being connected therein to produce an output signal of zero at said common terminal with said control element in its normal position, a positive output signal upon exposure of one of said radiation sensitive areas, and a negative output signal upon exposure of the other of said radiation sensitive areas to radiation; and further circuit means including said second radiation sensitive means similarly connected.

References Cited

UNITED STATES PATENTS

| | | | | |
|---|---|---|---|---|
| 884,501 | 4/1908 | Korn | 250—231 | X |
| 2,447,344 | 8/1948 | Kliever | 250—231 | X |
| 3,128,387 | 4/1964 | Huges et al. | 250—237 | |
| 3,164,838 | 1/1965 | Heinrich | 352—69 | |
| 3,254,225 | 5/1966 | Sklaroff | 250—231 | |
| 3,365,639 | 1/1968 | Jacobs | 250—231 | X |

ROBERT SEGAL, Primary Examiner

U.S. Cl. X.R.

250—221, 237